(12) United States Patent
Venugopal et al.

(10) Patent No.: US 8,833,327 B2
(45) Date of Patent: Sep. 16, 2014

(54) PISTON AND COMBUSTION CHAMBER

(75) Inventors: Rishikesh Venugopal, Columbus, IN (US); John M. Deur, Columbus, IN (US); Jason W. Mackey, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 449 days.

(21) Appl. No.: 13/339,039

(22) Filed: Dec. 28, 2011

(65) Prior Publication Data

US 2013/0167806 A1   Jul. 4, 2013

(51) Int. Cl.
*F02M 61/14* (2006.01)

(52) U.S. Cl.
USPC ........................................ 123/193.6; 123/279

(58) Field of Classification Search
USPC ........... 123/193.1, 193.6, 261–263, 276, 279, 123/284, 285, 470, 661
See application file for complete search history.

(56) References Cited

U.S. PATENT DOCUMENTS

| | | | |
|---|---|---|---|
| 4,920,937 A | 5/1990 | Sasaki et al. | |
| 5,359,972 A | 11/1994 | Isaka | |
| 5,517,961 A | 5/1996 | Ward | |
| 5,709,190 A | 1/1998 | Suzuki | |
| 5,960,767 A | 10/1999 | Akimoto et al. | |
| 6,129,066 A | 10/2000 | Umierski | |
| 6,138,639 A | 10/2000 | Hiraya et al. | |
| 6,173,690 B1 | 1/2001 | Iriya et al. | |
| 6,209,514 B1 | 4/2001 | Matayoshi et al. | |
| 6,418,905 B1 | 7/2002 | Baudlot et al. | |
| 6,615,789 B2 | 9/2003 | Inoue et al. | |
| 6,637,402 B2 | 10/2003 | Liu | |
| 6,725,828 B1 | 4/2004 | Han et al. | |
| 6,732,703 B2 | 5/2004 | Eckerle et al. | |
| 6,799,550 B2 | 10/2004 | Wirth | |
| 6,892,693 B2 | 5/2005 | Montgomery et al. | |

(Continued)

FOREIGN PATENT DOCUMENTS

| EP | 1 338 782 B1 | 10/2004 |
|---|---|---|
| EP | 0945603 B1 | 6/2005 |

(Continued)

OTHER PUBLICATIONS

International Search Report and Written Opinion of the International Searching Authority dated Apr. 22, 2013 from corresponding International Application No. PCT/US2012/071656.

*Primary Examiner* — John Kwon
*Assistant Examiner* — Johnny H Hoang
(74) *Attorney, Agent, or Firm* — Faegre Baker Daniels LLP (57) ABSTRACT

A piston and an engine are provided that includes various precise configuration parameters, including dimensions, shape and/or relative positioning of the combustion chamber features, resulting in a combustion process that yields improved mixing of fuel and intake air and increased uniformity of load on the engine pistons. The piston provides a piston bowl with a concave curvilinear portion that may be semi-spherical and extends inwardly to a depth; an angled surface extends inwardly from the crown surface to intersect the concave curvilinear portion at an edge at a depth; and a curved surface that extends inwardly from the crown surface to intersect the concave curvilinear portion at a tangent at a depth. The angled surface may be part of a frusto-conical surface that may extend from both sides of the angled surface to an area proximate the curved surface.

39 Claims, 5 Drawing Sheets

(56) References Cited

U.S. PATENT DOCUMENTS

| | | |
|---|---|---|
| 7,021,279 B1 | 4/2006 | Pott et al. |
| 7,210,448 B2 | 5/2007 | Stanton et al. |
| 7,681,564 B2 | 3/2010 | Umierski et al. |
| 7,926,463 B2 | 4/2011 | Ashizawa et al. |
| 8,677,970 B2 * | 3/2014 | Venugopal et al. ........ 123/193.6 |
| 2003/0159675 A1 * | 8/2003 | Huebler et al. ............... 123/306 |
| 2005/0066929 A1 * | 3/2005 | Liu ........................... 123/193.4 |
| 2009/0194066 A1 | 8/2009 | Ashizawa et al. |

FOREIGN PATENT DOCUMENTS

| | | |
|---|---|---|
| JP | 10-325327 A | 12/1998 |
| JP | 2004-245171 A | 9/2004 |
| JP | 2009-68354 A | 4/2009 |

\* cited by examiner

PISTON AND COMBUSTION CHAMBER

TECHNICAL FIELD

This disclosure relates to the design of pistons and combustion chambers for use in internal combustion engines.

BACKGROUND

Internal combustion engine designers have been challenged to improve fuel efficiency and decrease emissions. One way of accomplishing both increased fuel efficiency and decreased emissions is to increase the efficiency of burning fuel in the combustion chambers of internal combustion engines. Therefore, there is a need for an improved combustion chamber to accomplish these purposes.

SUMMARY

This disclosure provides a piston for an internal combustion engine comprising a piston crown having an end surface, a central axis and a bowl formed therein. The bowl includes a concave curvilinear portion formed within the bowl. The concave curvilinear portion may have a radius R2 with a center of radius positioned a radial distance R1 from the central axis. The bowl also includes an angled surface that extends inwardly from proximate the end surface to intersect the concave curvilinear portion to form an edge at an axial distance L1 from the end surface. The bowl also includes a curved surface located on an opposite side of the piston crown from the angled surface that extends inwardly from proximate the end surface to intersect the concave curvilinear portion at an axial distance L2 from the end surface, wherein the curved surface intersects the concave curvilinear portion approximately tangentially. The distance L1 is greater than the distance L2 and distance L2 is greater than zero.

This disclosure also provides a combustion chamber for an internal combustion engine comprising an engine body and a piston positioned within a cylinder of the internal combustion engine. The piston includes a crown having an end surface, a central axis and a bowl formed therein. The bowl includes a concave curvilinear portion formed within the bowl. The concave curvilinear portion may have a radius R2 with a center of radius positioned a radial distance R1 from the central axis. The bowl also includes an angled surface that extends inwardly from proximate the end surface to intersect the concave curvilinear portion to form an edge at an axial distance L1 from the end surface. The bowl also includes a curved surface located on an opposite side of the piston crown from the angled surface that extends inwardly from proximate the end surface to intersect the concave curvilinear portion at an axial distance L2 from the end surface, wherein the curved surface intersects the concave curvilinear portion approximately tangentially. The distance L1 is greater than the distance L2 and distance L2 is greater than zero. The combustion chamber also comprises a fuel injecting mechanism mounted on the engine body, wherein the fuel injecting mechanism is positioned to direct fuel toward the angled surface.

This disclosure further provides a combustion chamber for an internal combustion engine comprising an engine body and a piston positioned within a cylinder of the internal combustion engine. The piston includes a crown having an end surface, a central axis and a bowl formed therein. The bowl includes a concave curvilinear portion formed within the bowl. The concave curvilinear portion may have a radius R2 with a center of radius positioned a radial distance R1 from the central axis. The bowl also includes an angled surface that extends inwardly from proximate the end surface to intersect the concave curvilinear portion to form an edge at an axial distance L1 from the end surface. The bowl also includes a curved surface located on an opposite side of the piston crown from the angled surface that extends inwardly from proximate the end surface to intersect the concave curvilinear portion at an axial distance L2 from the end surface, wherein the curved surface intersects the concave curvilinear portion approximately tangentially. The distance L1 is greater than the distance L2 and distance L2 is greater than zero. The combustion chamber also comprises a fuel injecting mechanism mounted on a mounting portion of the engine body.

This disclosure further provides a piston for an internal combustion engine comprising a piston crown having an end surface, a central axis, and a bowl formed in the piston crown. The bowl includes a concave curvilinear portion formed within the bowl. The concave curvilinear portion has a radius R2 with a center of radius positioned a spaced radial distance R1 from the central axis. The bowl further includes an angled surface extending inwardly from proximate the end surface to intersect the concave curvilinear portion. The bowl further includes a curved surface located on an opposite side of the piston crown from the angled surface and extending inwardly from proximate the end surface to intersect the concave curvilinear portion. The curved surface intersects the concave curvilinear portion approximately tangentially. The bowl further includes a frusto-conical surface extending angularly about the piston crown from either side of the angled surface toward the curved surface.

Advantages and features of the embodiments of this disclosure will become more apparent from the following detailed description of exemplary embodiments when viewed in conjunction with the accompanying drawings.

DETAILED DESCRIPTION

Figure 1:
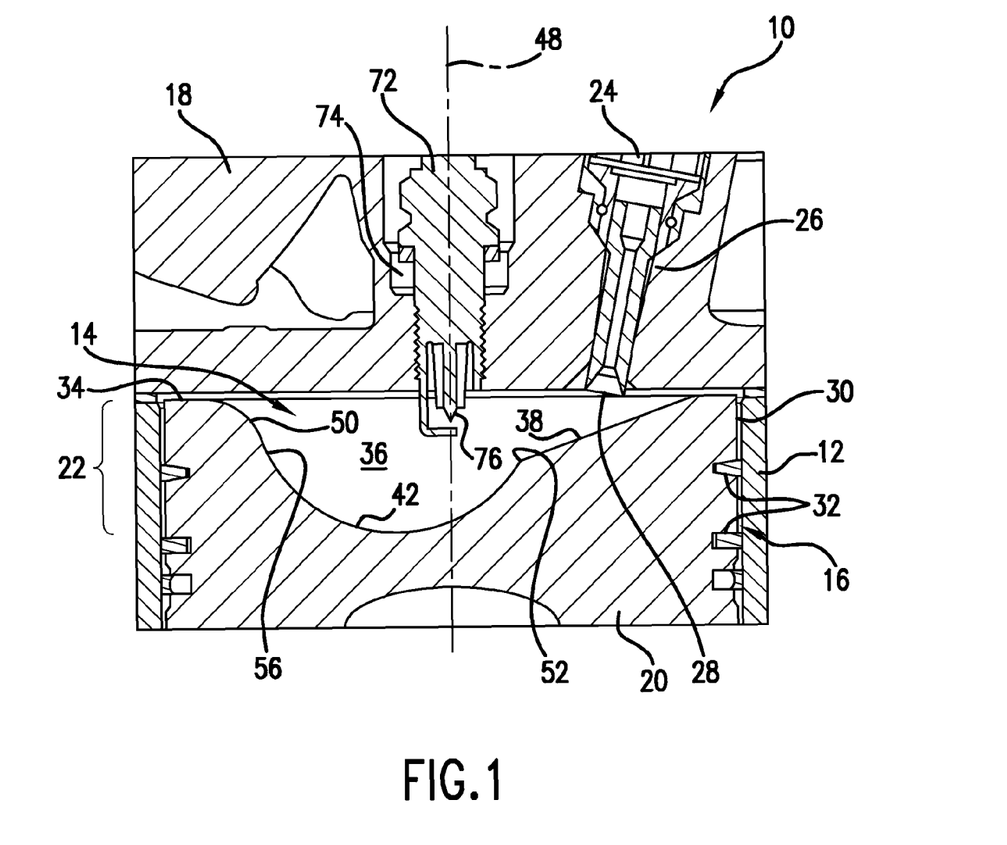
FIG. 1 is a sectional view of a portion of an internal combustion engine of the present disclosure employing a combustion chamber arrangement of the present disclosure with a piston in the top dead center position.

Referring now to FIG. 1, the present disclosure is directed to an internal combustion engine, a portion of which is shown in a cutaway cross sectional view and generally indicated at 10, having an improved combustion chamber 14 capable of increasing the homogeneity of the fuel-air mixture in an internal combustion engine. Increasing the homogeneity of the fuel-air mixture is advantageous in increasing thermal efficiency of internal combustion engine 10, reducing unburned hydrocarbons, and improving the load across a piston. Increased homogeneity, which also reduces stratification, may also reduce undesirable operational phenomena such as engine knock, particularly under high load conditions.

Engine 10 also includes an engine body that includes an engine block 12, a small portion of which is shown in FIG. 1, cylinder head 18 mounted on engine block 12, and combustion chamber 14. Engine 10 may contain a plurality of such combustion chambers in a variety of configurations that include a straight or in-line configuration and a "V" configuration. The number of chambers may vary, with common configurations including four to eight such chambers. Each combustion chamber 14 is formed at the end of a cylinder cavity 16, which may be formed directly in engine block 12. Cylinder cavity 16 may optionally be configured to receive a separate cylinder liner (not shown). One end of cylinder cavity 16 may be closed by engine cylinder head 18.

Engine 10 also includes a piston 20 positioned in cylinder cavity 16 that is associated with combustion chamber 14. Piston 20 may be any type of piston configuration as long as it contains the features identified hereinbelow necessary for accomplishing the present disclosure. For example, piston 20 may be an articulated piston or a single piece piston design. Crown 22 of piston 20 cooperates with cylinder head 18 and the portion of cylinder cavity 16 extending between cylinder head 18 and crown 22 to define combustion chamber 14. Although not specifically illustrated, piston 20 is connected through a connecting rod to a crankshaft of internal combustion engine 10, which causes piston 20 to reciprocate along a rectilinear path within cylinder cavity 16 as the engine crankshaft rotates. FIG. 1 illustrates the position of piston 20 in a top dead center (TDC) position achieved when the crankshaft is positioned to move piston 20 to the furthest most position away from the rotational axis of the crankshaft. In a conventional manner, piston 20 moves from the top dead center position to the bottom dead center (BDC) position when advancing through intake and power strokes. For purposes of this disclosure, the words "outward" and "outwardly" correspond to the direction away from the engine crankshaft and the words "inward" and "inwardly" correspond to the direction toward the crankshaft of the engine or bottom dead center position of piston 20.

Engine 10 also includes a fuel injector 24 secured within a mounting portion 26 of the engine body of engine 10 for injecting fuel at very high pressure into combustion chamber 14 when piston 20 is approaching, at or moving away from the TDC position. Fuel injector 24 may be a variety of configurations as long as it contains the features identified hereinbelow necessary for accomplishing the present invention(s). For example, fuel injector 24 may be a closed nozzle injector or an open nozzle injector. Moreover, fuel injector 24 may include a mechanically actuated plunger housed within fuel injector 24 for creating high pressure during an advancement stroke of the plunger. Alternatively, fuel injector 24 may receive high-pressure fuel from an upstream high-pressure source such as in a pump-line-nozzle system including one or more high-pressure pumps and/or a high-pressure accumulator and/or a fuel distributor. Fuel injector 24 may include an electronically actuated injection control valve which supplies high pressure fuel to the nozzle to open a nozzle valve element or controls the draining of high pressure fuel from a nozzle valve cavity to create a pressure imbalance on a nozzle valve element, thereby causing the nozzle valve element to open and close to form an injection event. For example, the nozzle valve element may be a conventional spring-biased closed nozzle valve element actuated by fuel pressure, such as disclosed in U.S. Pat. No. 5,326,034, the entire content of which is hereby incorporated by reference. Fuel injector 24 may be in the form of the injector disclosed in U.S. Pat. No. 5,819,704, the entire content of which is hereby incorporated by reference. Fuel injector 24 includes at least one injector nozzle or spray orifice 28 formed at one end of fuel injector 24 for directing high-pressure fuel to flow from fuel injector 24 into combustion chamber 14. A combustion igniter 72 may also be located in association with combustion chamber 14. Combustion igniter 72 is positioned within an igniter bore 74 formed within cylinder head 18. Combustion igniter 72 may include an igniter element 76 positioned at an extension of piston central axis 48 that is in communication with combustion chamber 14.

The piston of the present disclosure includes features sized, shaped and/or positioned relative to one another, as described hereinbelow, to advantageously increase the homogeneity of the fuel-air mixture in combustion chamber 14, thereby increasing the thermal efficiency of engine 10, reducing unburned hydrocarbons, and improving the load across crown 22. The increased homogeneity also reduces stratification in the fuel-air mixture, which may also reduce undesirable operational phenomena such as engine knock under high load conditions. Specifically, the dimensions, shape and/or relative position of piston 20 features improves the mixing of injected fuel with air in combustion chamber 14, leading to an improved homogeneity in the fuel-air mixture. The dimensions of piston 20, the shape of piston 20, and/or the relative position of piston 20 within combustion chamber 14 and with the components and features described hereinbelow results in a combustion chamber capable of forming, directing, controlling and creating a pattern of injected fuel and gaseous flow within combustion chamber 14 during the initial stages of fuel injection and during the initiation of combustion and expansion of the resulting gases during the power stroke of piston 20 so as to achieve optimum fuel combustion characteristics.

To understand the unique physical characteristics of combustion chamber 14, refer to FIGS. 1-4, which illustrate the various physical characteristics or parameters required to achieve the unexpected homogeneity of the fuel-air mixture advantages of the present disclosure. While combustion chambers have been previously described in internal combustion engine art, it is the specific configuration, and more importantly, the critical dimensions and dimensional relationships described hereinbelow that result in the improved functional performance of the present disclosure.

Piston 20 and crown 22 include a cylindrical wall 30 having a radius Rp and a plurality of annular grooves 32 for receiving corresponding piston rings designed to form a partial fluid seal between the piston and the surrounding walls of engine block 12 or, alternatively, a cylinder liner (not shown). Crown 22 includes an end surface 34 and a piston bowl 36, which partially forms combustion chamber 14. In the exemplary embodiment, end surface 34 extends annularly around the entire circumference of piston crown 22 and preferably lies in a single transverse plane extending perpendicularly to piston central axis 48. Piston bowl 36 comprises multiple features, as noted in more detail hereinbelow.

Figure 2A:
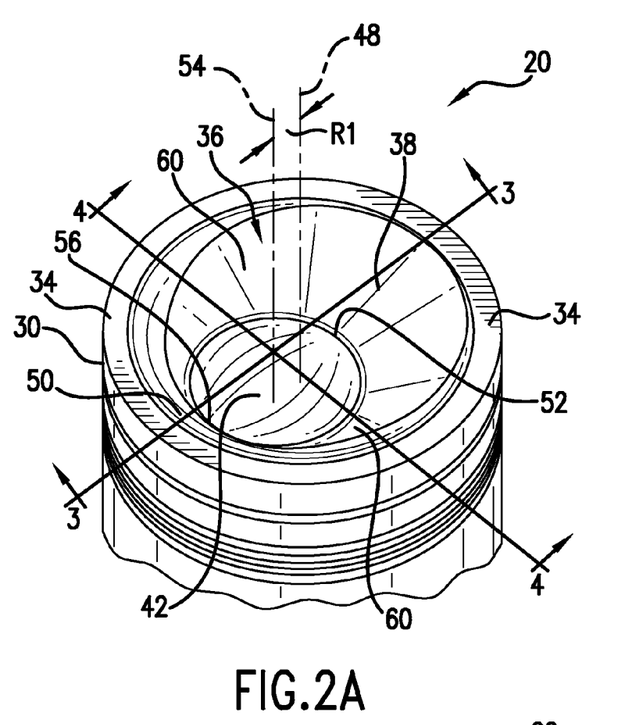
FIG. 2A is a perspective view of a piston crown of the piston shown in FIG. 1.
Figure 2B:
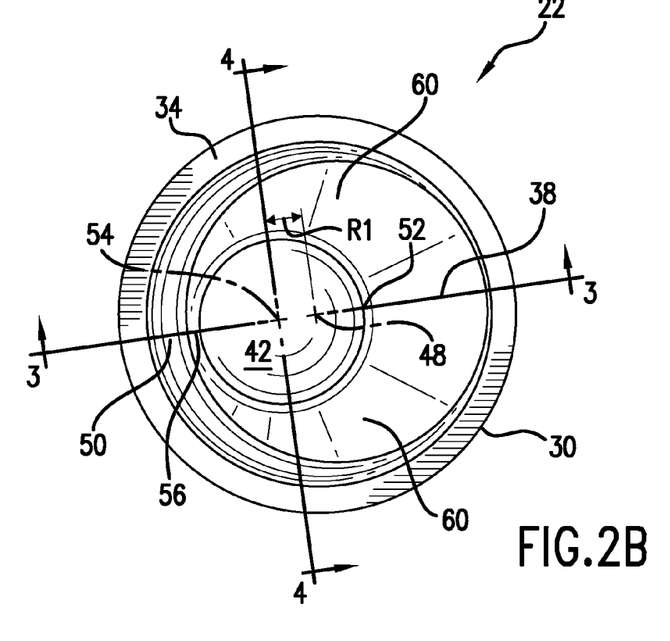
FIG. 2B is a plan view of the piston crown of the piston shown in FIG. 1.
Figure 3:
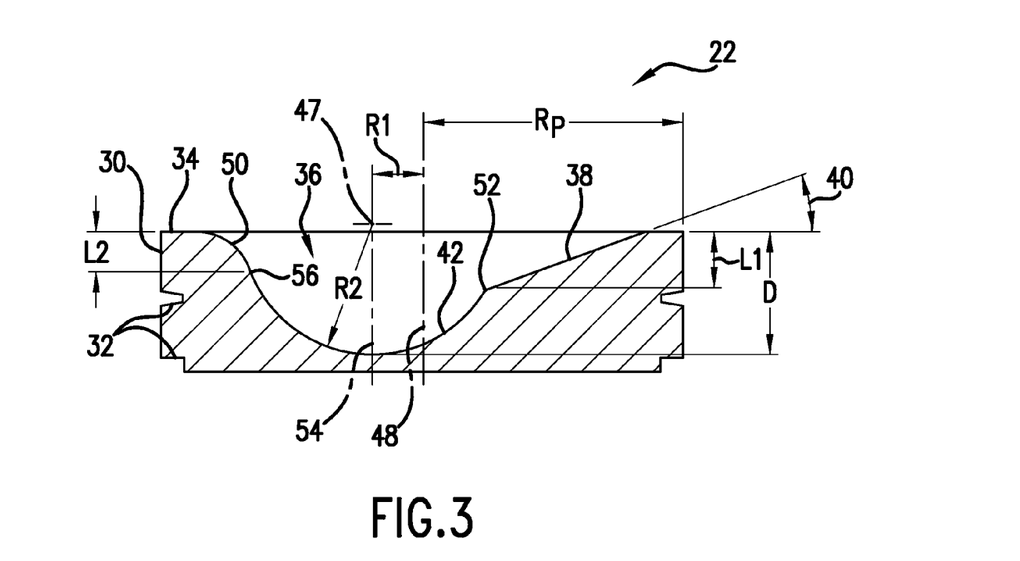
FIG. 3 is a sectional view of the piston crown along plane 3-3 in FIG. 2A and FIG. 2B; plane 3-3 extends through the piston central axis.

As shown particularly in FIG. 3, which is a partial sectional view of piston 20 at plane 3-3 in FIG. 2A and FIG. 2B, an angled surface 38 extends inwardly from end surface 34 of crown 22. In the exemplary embodiment, angled surface 38 is generally straight or flat in cross-section taken along plane 3-3. Angled surface 38 forms an angle 40 with respect to end surface 34 that is preferably at least five degrees and no more than thirty-one degrees. A concave curvilinear portion 42 is formed within piston bowl 36. Concave curvilinear portion 42 may have a radius R2 and may have a semi-spherical form. The center of radius R2 is located at a radial distance R1 from piston central axis 48 and is indicated at 47. Axis 54 extends axially through the center of radius 47 and through the center of concave curvilinear portion 42 and is parallel to piston central axis 48. The depth D of the innermost surface of concave curvilinear portion 42 from end surface 34, which is measured axially along axis 54, which is also axially along piston 20, is preferably less than radius R2, which therefore means that the center of radius R2, indicated at 47, is preferably axially above piston 20. At the opposite side of crown 22 from angled surface 38, or about 180 degrees around the piston crown from angled surface 38, is a curved surface 50 that extends inwardly from end surface 34. Both angled surface 38 and curved surface 50 intersect concave curvilinear portion 42. The intersection of angled surface 38 with concave curvilinear portion 42 forms an edge 52. Edge 52 is at an axial distance L1 from end surface 34. Edge 52 preferably has a small radius consistent with manufacturing practice, but may be a relatively sharp edge. The intersection of curved surface 50 with concave curvilinear portion 42 is approximately at a tangent 56 to both curved surface 50 and to concave curvilinear portion 42 at an axial distance L2 from end surface 34.

In order to accomplish the features described herein, the dimensions described hereinabove are preferably within certain ranges. More specifically, axial distance L1 should be greater than axial distance L2. Furthermore, the ratio of axial distance L1 to axial distance L2 should be greater than 1.2 and less than 8.0. With respect to crown radius Rp, the ratio of radial distance R1 to crown radius Rp is preferably less than 0.5. The ratio of radius R2 to crown radius Rp is preferably greater than 0.2 and less than 1.0. The ratio of depth D to crown radius Rp is preferably greater than 0.1 and less than 0.5.

Figure 4:
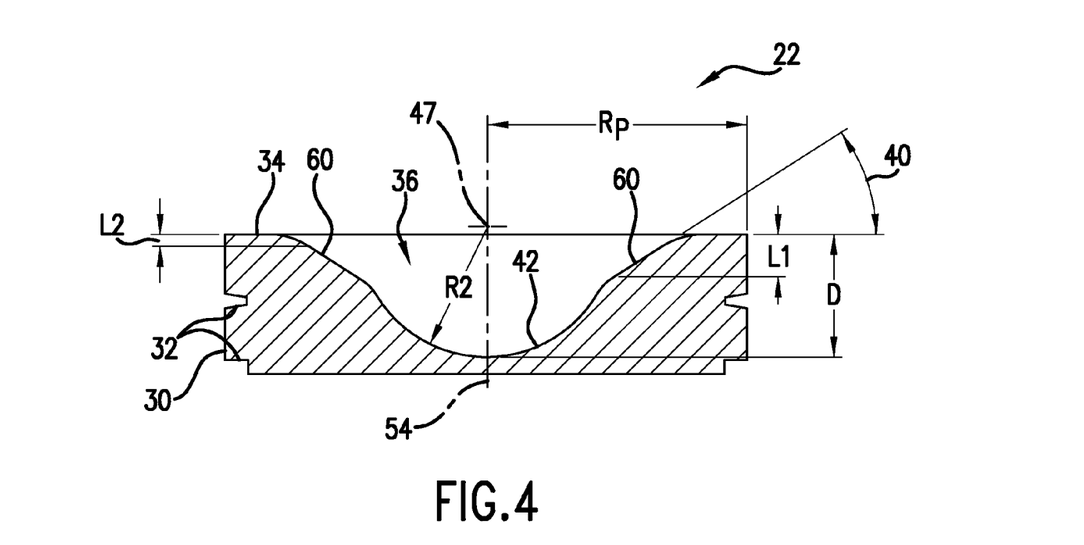
FIG. 4 is a section view of the piston crown along plane 4-4 of FIG. 2A and FIG. 2B; plane 4-4 is offset from the piston central axis and is perpendicular to plane 3-3.

As can be seen in FIG. 3, there is a difference between the geometry of angled surface 38 and the geometry of curved surface 50. In order to transition from angled surface 38 to curved surface 50 and as shown, for example, in FIG. 2A and FIG. 2B, angled surface 38 may be a part of a surface portion 60 extending angularly about crown 22, extending from proximate both sides of curved surface 50 to angled surface 38. Surface portion 60 provides for a generally smooth or continuous transition from angled surface 38 to curved surface 50, which permits advantages in fuel flow and airflow in piston bowl 36. A part of surface portion 60 is shown in FIG. 4, which is a partial sectional view of piston 20 at plane 4-4 of FIG. 2A and FIG. 2B. Generally, piston bowl 36 is symmetric about plane 3-3. Note that plane 3-3 extends through piston central axis 48 and through axis 54 of concave curvilinear portion 42.

In the exemplary embodiment, surface portion 60 starts proximate tangent 56, extends angularly around concave curvilinear portion 42 through angled surface 38, and terminates proximate tangent 56 on the opposite side of plane 3-3 from the starting point of surface portion 60. From angled surface 38, surface portion 60 gradually decreases in width on either side of angled surface 38 as surface portion 60 extends angularly away from angled surface 38 about concave curvilinear portion 42. The width of surface portion 60 decreases to zero proximate tangent 56 on both sides of tangent 56, and therefore tangent 56 becomes a gap in surface portion 60 and separates opposing spaced ends of surface portion 60. The forgoing discussion also means that angled surface 38 is at the maximum width of surface portion 60, which is also opposite curved surface 50 where curved surface 50 meets the concave curvilinear portion at tangent 56. Opposite in this context generally means 180 degrees about piston crown 22 from curved surface 50.

At least a portion of surface portion 60 may be shaped as a frusto-conical segment, particularly the portion proximate to angled surface 38. Thus, the entire surface portion 60 may be a frusto-conical segment so that angled surface 38 is part of a frusto-conical segment. In another embodiment, surface portion 60 gradually changes from a frusto-conical surface to a curved surface moving from surface 38 to curved surface 50. In yet another embodiment, surface 38 may be generally straight or flat, but surface portion 60 acquires a slight curve in the region proximate surface 38, becoming increasingly curved as surface portion 60 extends toward curved surface 50. In the exemplary embodiment, angled surface portion 38 is a frusto-conical segment having a C-shape that extends circumferentially about concave curvilinear portion for at least 60 degrees to ensure proper guidance to a fuel spray plume, as will be discussed hereinbelow.

Figure 5A:
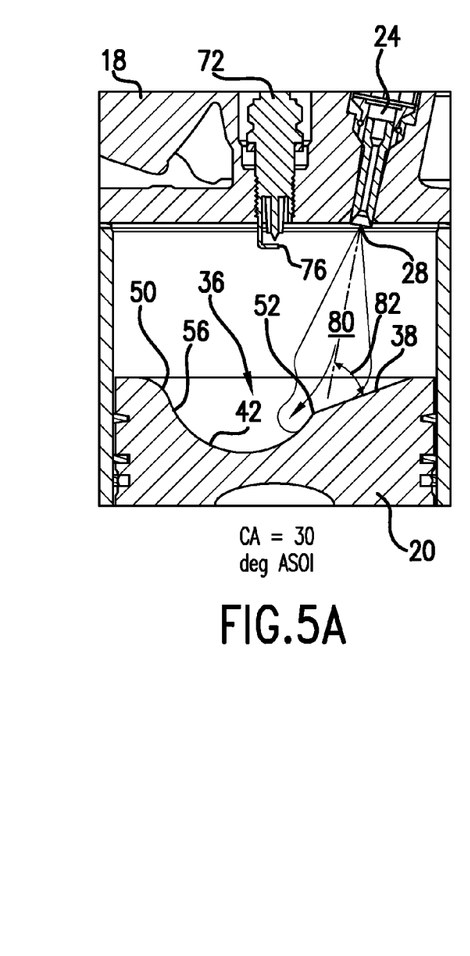
FIG. 5A is a sectional view of a portion of the internal combustion engine of FIG. 1 with the piston positioned in response to a crank angle of 30 degrees after the start of fuel injection (ASOI).
Figure 5B:
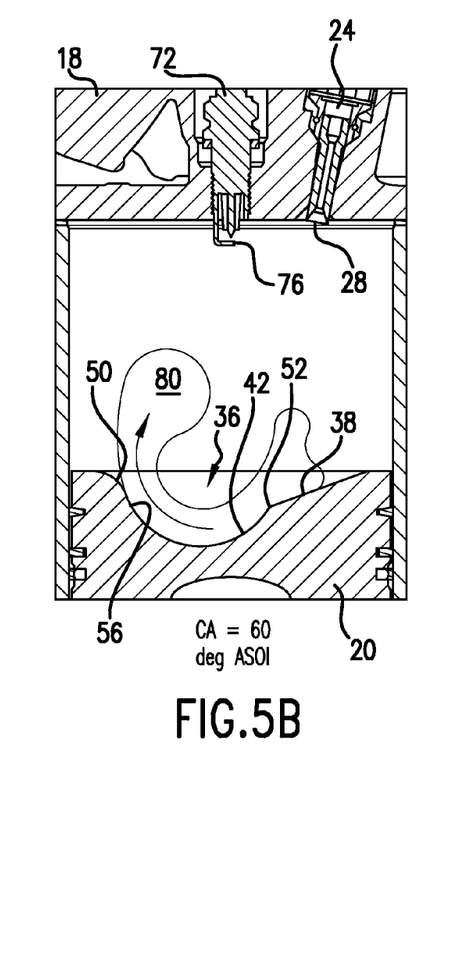
FIG. 5B is a sectional view of a portion of the internal combustion engine of FIG. 1 with the piston positioned in response to a crank angle of 60 degrees ASOI.
Figure 5C:
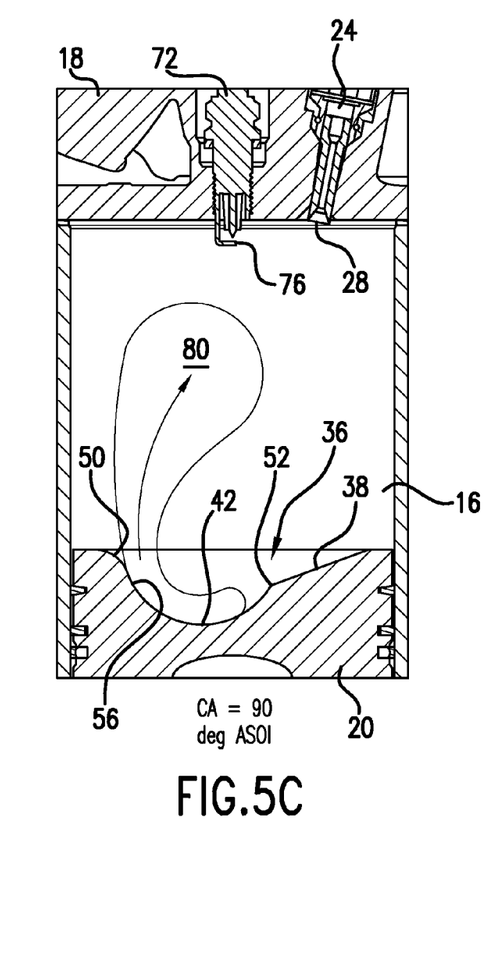
FIG. 5C is a sectional view of a portion of the internal combustion engine of FIG. 1 with the piston positioned in response to a crank angle of 90 degrees after the start of fuel injection (ASOI).
Figure 6:
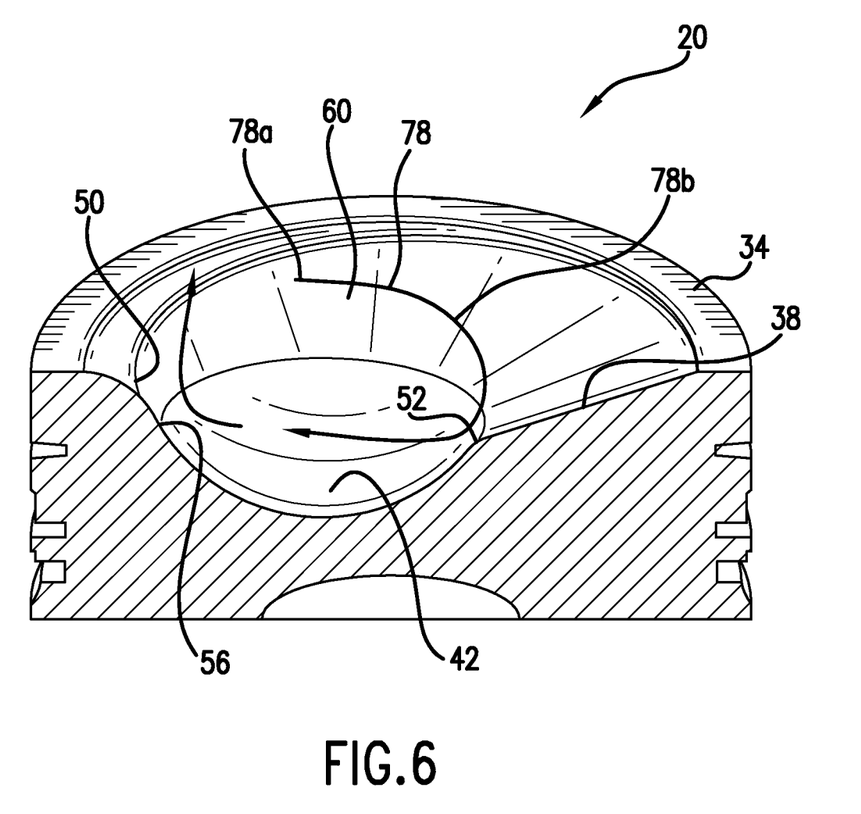
FIG. 6 is a perspective view of the piston crown of FIG. 1 showing the general path of intake air along the piston crown.

The effect of this configuration may be seen in FIGS. 5-6. One or more intake ports (not shown) may be located within cylinder head 18. Intake ports permit air to enter combustion chamber 14 during various portions of the stroke of piston 20 determined by other elements of internal combustion engine 10 (not shown). The intake ports may be associated with a turbocharger (not shown) or a supercharger (not shown) to increase the flow of air to the intake ports. Other elements or features may also be associated with the intake ports, such as recirculating exhaust gas (not shown). One or more exhaust ports (not shown) permit the release of combustion byproducts from combustion chamber 14 during various portion of the stroke of piston 20 determined by other elements of internal combustion engine 10, as is known in the art.

As air from the intake ports flows into combustion chamber 14, air will begin to move in a swirling pattern. This swirling pattern is undesirable as it yields stratification of an air-fuel mixture, leading to incomplete fuel combustion and uneven loading of a piston. The present disclosure addresses this concern by providing the geometries for piston bowl 36 previously described. This improvement works as follows. Air enters combustion chamber 14 from intake ports. As shown in FIG. 6, as air flows into combustion chamber 14, it travels from region 78a along airflow path 78 toward region 78b. Referring now to FIGS. 5A, 5B and 5C, while air is being drawn or forced into combustion chamber 14, fuel spray plume 80 is being injected into combustion chamber 14 by fuel injector 24 through at least one injector nozzle or spray orifice 28. Fuel injector 24 is positioned so that at least one injector nozzle or spray orifice 28 is oriented to inject plume 80 along a path extending at acute angle 82 to angled surface 38, causing plume 80 to travel along angled surface 38 toward edge 52. Note that spray orifice 28 is positioned on the opposite side of piston axis 48 from curved portion 50, or about 180 degrees around piston axis 48 from curved portion 50. Edge 52 serves to affect the flow of plume 80 as well as air traveling along path 78 by forcing a tumbling motion to both elements. Such tumbling is in effect turbulence, which improves mixing of plume 80 with intake air. The difference between axial distance L1 and axial distance L2 and the ratio of axial distance L1 to axial distance L2 leads to improved mixture homogeneity in piston bowl 36.

As piston 20 continues to travel away from the TDC position, as shown in FIGS. 5B and 5C, plume 80 continues traveling along piston bowl 36 and then outwardly from piston bowl 36. It is considered desirable to have plume 80 travel toward igniter element 76 of combustion igniter 72 while plume 80 expands. This path will thus place plume 80 proximate igniter element 76 when igniter element 76 is signaled to cause ignition of plume 80. Radius R1 is chosen to effect the travel of plume 80 toward igniter element 76, in combination with the previously described dimensions of piston bowl 36.

This configuration yields significant improvements in the volumetric distribution of the equivalence ratio in combustion chamber 14 over a baseline piston at an indicated mean effective pressure (IMEP) of 3 bars with an engine operating at 1500 RPM and at two degrees before actuation of igniter element 76 and at an IMEP of 15 bars, a relatively high load condition, with an engine operating at 1500 RPM and at two degrees before actuation of igniter element 76.

Another measure of performance improvement is in the standard deviation a of the equivalence ratio distribution for a baseline piston and for improved piston 20 at an IMEP of 3 bars at 1500 RPM. The standard deviation is beneficially reduced by about 23% under these operating conditions for improved piston 20. The standard deviation a of the equivalence ratio distribution for a baseline piston and for improved piston 20 at an IMEP of 15 bars, a relatively high load condition, at 1500 RPM is beneficially reduced by about 57% under these operating conditions for improved piston 20.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A piston for an internal combustion engine, comprising:
a piston crown having an end surface and a central axis; and
a bowl formed in the piston crown; the bowl including
a concave curvilinear portion formed within the bowl, the concave curvilinear portion having a radius R2 with a center of radius positioned a spaced radial distance R1 from the central axis;
an angled surface extending inwardly from proximate the end surface to intersect the concave curvilinear portion to form an edge at an axial distance L1 from the end surface;
a curved surface located on an opposite side of the piston crown from the angled surface and extending inwardly from proximate the end surface to intersect the concave curvilinear portion at an axial distance L2 from the end surface, wherein the curved surface intersects the concave curvilinear portion approximately tangentially; and
wherein L1>L2>0.

2. The piston of claim 1, wherein the ratio L1/L2 is greater than 1.2 and less than 8.0.

3. The piston of claim 1, wherein the angled surface intersects the end surface at an angle that is at least 5 degrees and no more than 31 degrees.

4. The piston of claim 1, wherein the radius of the piston crown is Rp and wherein the ratio R1/Rp is less than 0.5.

5. The piston of claim 1, wherein the radius of the piston crown is Rp and wherein the ratio R2/Rp is greater than 0.2 and less than 1.0.

6. The piston of claim 1, wherein the radius of the piston crown is Rp, wherein the axial distance from the end surface to the lowest point of the concave curvilinear portion is D and wherein the ratio D/Rp is greater than 0.1 and less than 0.5.

7. The piston of claim 1, wherein the axial distance from the end surface to the lowest point of the concave curvilinear portion is D and wherein R2 is greater than D.

8. The piston of claim 1, wherein the concave curvilinear portion is semi-spherical.

9. The piston of claim 1, wherein said angled surface is flat.

10. An internal combustion engine containing a combustion chamber, comprising:
an engine body;
a piston mounted in the engine body, the piston including:
a piston crown having an end surface and a central axis; and
a bowl formed in the piston crown; the bowl including
a concave curvilinear portion formed within the bowl, the concave curvilinear portion having a radius R2 with a center of radius positioned a spaced radial distance R1 from the central axis;
an angled surface extending inwardly from proximate the end surface to intersect the concave curvilinear portion to form an edge at an axial distance L1 from the end surface;
a curved surface located on the opposite side of the piston crown from the angled surface and extending inwardly from proximate the end surface to intersect the concave curvilinear portion at an axial distance L2 from the end surface, wherein the curved surface intersects the concave curvilinear portion approximately tangentially;
wherein L1>L2>0; and
a fuel injecting mechanism mounted on the engine body and positioned to direct fuel toward the angled surface.

11. The engine of claim 10, further comprising a combustion igniter mounted on the engine body and including an igniter element positioned along an extension of the central axis of the piston crown.

12. The engine of claim 10, wherein the fuel injecting mechanism is positioned a spaced radial distance from an extension of the central axis of the piston crown.

13. The engine of claim 10, wherein the fuel injecting mechanism includes at least one spray orifice arranged to direct a spray plume along a plume path extending toward the central axis of the piston crown to form an acute angle between the spray plume axis and the angled surface.

14. The engine of claim 10, wherein the ratio L1/L2 is greater than 1.2 and less than 8.0.

15. The engine of claim 10, wherein the angled surface intersects the end surface at an angle that is at least 5 degrees and no more than 31 degrees.

16. The engine of claim 10, wherein the radius of the crown is Rp and wherein the ratio R1/Rp is less than 0.5.

17. The engine of claim 10, wherein the radius of the crown is Rp and wherein the ratio R2/Rp is greater than 0.2 and less than 1.0.

18. The engine of claim 10, wherein the radius of the crown is Rp, wherein the axial distance from the end surface to the lowest point of the concave curvilinear portion is D and wherein the ratio D/Rp is greater than 0.1 and less than 0.5.

19. The engine of claim 10, wherein the axial distance from the end surface to the lowest point of the concave curvilinear portion is D and wherein R2 is greater than D.

20. An internal combustion engine containing a combustion chamber, comprising:
  an engine body;
  a piston mounted in the engine body; the piston including
    a piston crown having an end surface and a central axis; and
    a bowl formed in the piston crown; the bowl including
      a concave curvilinear portion formed within the bowl, the concave curvilinear portion having a radius R2 with a center of radius positioned a spaced radial distance R1 from the central axis;
      an angled surface extending inwardly from proximate the end surface to intersect the concave curvilinear portion to form an edge at an axial distance L1 from the end surface;
      a curved surface located on the opposite side of the piston crown from the angled surface and extending inwardly from proximate the end surface to intersect the concave curvilinear portion at an axial distance L2 from the end surface, wherein the curved surface intersects the concave curvilinear portion approximately tangentially;
      wherein L1>L2>0;
  wherein the engine body includes a mounting portion positioned on the opposite side of the combustion chamber from the angled portion; and
  wherein a fuel injecting mechanism is mounted on the mounting portion of the engine body.

21. The engine of claim 20, further comprising a combustion igniter mounted on the engine body and including an igniter element positioned along an extension of the central axis of the piston crown.

22. The engine of claim 20, wherein the fuel injecting mechanism is positioned a spaced radial distance from an extension of the central axis of the piston crown.

23. The engine of claim 20, wherein the fuel injecting mechanism includes at least one spray orifice arranged to direct a spray plume along a plume path extending toward the central axis of the piston crown to form an acute angle between the spray plume axis and the angled surface.

24. The engine of claim 20, wherein the ratio L1/L2 is greater than 1.2 and less than 8.0.

25. The engine of claim 20, wherein the angled surface intersects the end surface at an angle that is at least 5 degrees and no more than 31 degrees.

26. The engine of claim 20, wherein the radius of the crown is Rp and wherein the ratio R1/Rp is less than 0.5.

27. The engine of claim 20, wherein the Radius of the crown is Rp and wherein the ratio R2/Rp is greater than 0.2 and less than 1.0.

28. The engine of claim 20, wherein the radius of the crown is Rp, wherein the axial distance from the end surface to the lowest point of the concave curvilinear portion is D and wherein the ratio D/Rp is greater than 0.1 and less than 0.5.

29. The engine of claim 20, wherein the axial distance from the end surface to the lowest point of the concave curvilinear portion is D and wherein R2 is greater than D.

30. A piston for an internal combustion engine, comprising:
  a piston crown having an end surface and a central axis; and
  a bowl formed in the piston crown; the bowl including
    a concave curvilinear portion formed within the bowl, the concave curvilinear portion having a radius R2 with a center of radius positioned a spaced radial distance R1 from the central axis;
    an angled surface extending inwardly from proximate the end surface to intersect the concave curvilinear portion;
    a curved surface located on an opposite side of the piston crown from the angled surface and extending inwardly from proximate the end surface to intersect the concave curvilinear portion, wherein the curved surface intersects the concave curvilinear portion approximately tangentially; and
    a frusto-conical surface extending angularly about piston crown from either side of the angled surface.

31. The piston of claim 30, wherein the frusto-conical surface extends to a location proximate the curved surface.

32. The piston of claim 30, wherein the width of the frusto-conical surface is greatest at the angled surface and decreases gradually as the frusto-conical surface extends away from the angled surface.

33. The piston of claim 30, wherein the concave curvilinear portion has an axis and the frusto-conical surface extends about the axis of the concave curvilinear portion to the tangent intersection of the curved surface with the concave curvilinear portion.

34. The engine of claim 30, wherein the intersection of the angled surface and the concave curvilinear portion forms an edge at an axial distance L1 from the end surface, wherein the curved surface intersects the concave curvilinear surface tangentially at an axial distance L2 from the end surface, the ratio L1/L2 being greater than 1.2 and less than 8.0.

35. The engine of claim 30, wherein the angled surface intersects the end surface at an angle that is at least 5 degrees and no more than 31 degrees.

36. The engine of claim 30, wherein the radius of the crown is Rp and wherein the ratio R1/Rp is less than 0.5.

37. The engine of claim 30, wherein the radius of the crown is Rp and wherein the ratio R2/Rp is greater than 0.2 and less than 1.0.

38. The engine of claim 30, wherein the radius of the crown is Rp, wherein the axial distance from the end surface to the lowest point of the concave curvilinear portion is D and wherein the ratio D/Rp is greater than 0.1 and less than 0.5.

39. The engine of claim 30, wherein the axial distance from the end surface to the lowest point of the concave curvilinear portion is D and wherein R2 is greater than D.

* * * * *